United States Patent
Ichishi et al.

(10) Patent No.: US 6,827,284 B2
(45) Date of Patent: Dec. 7, 2004

(54) VEHICLE AIR CONDITIONER WITH AUTOMATIC AIR-CONDITIONING CONTROL

(75) Inventors: Yoshinori Ichishi, Kariya (JP); Akira Ohga, Ichinomiya (JP); Takayoshi Kawai, Hoi-gun (JP)

(73) Assignee: DENSO Corporation, Kariya (JP)

( * ) Notice: Subject to any disclaimer, the term of this patent is extended or adjusted under 35 U.S.C. 154(b) by 28 days.

(21) Appl. No.: 10/339,448

(22) Filed: Jan. 9, 2003

(65) Prior Publication Data

US 2003/0127527 A1 Jul. 10, 2003

(30) Foreign Application Priority Data

Jan. 10, 2002 (JP) .................................... 2002-003551
Jan. 28, 2002 (JP) .................................... 2002-018708

(51) Int. Cl.[7] .............................................. B60H 1/00
(52) U.S. Cl. .................... 236/49.3; 236/91 C; 165/204; 165/237
(58) Field of Search .............................. 236/49.3, 91 C; 62/244, 239, 208; 165/202, 203, 204, 237

(56) References Cited

U.S. PATENT DOCUMENTS 6,021,956 A * 2/2000 Haraguchi ................... 236/51
6,170,274 B1 * 1/2001 Ichishi et al. ................ 62/179
6,435,417 B1 * 8/2002 Holdgrewe et al. ....... 236/46 R

FOREIGN PATENT DOCUMENTS

JP     4-131641     5/1992
JP     9-210195     8/1997

* cited by examiner

Primary Examiner—Harry B. Tanner
(74) Attorney, Agent, or Firm—Harness, Dickey & Pierce, PLC

(57) ABSTRACT

A vehicle air conditioner controls the air-conditioning automatically based on a control characteristic. The control characteristic, such as a blower voltage calculation map, is selected from plural control characteristics, or obtained by a calculation based on the personal information of the passenger or the manual operation for the air conditioner by the passenger. The control characteristic is selected or calculated as the one which is supposed to be suitable for the passenger's preference. The control characteristic can be used as a basis, or a specific characteristic for learning the passenger's preference after the control characteristic is determined.

33 Claims, 11 Drawing Sheets

FIG. 6A  1st OPERATION
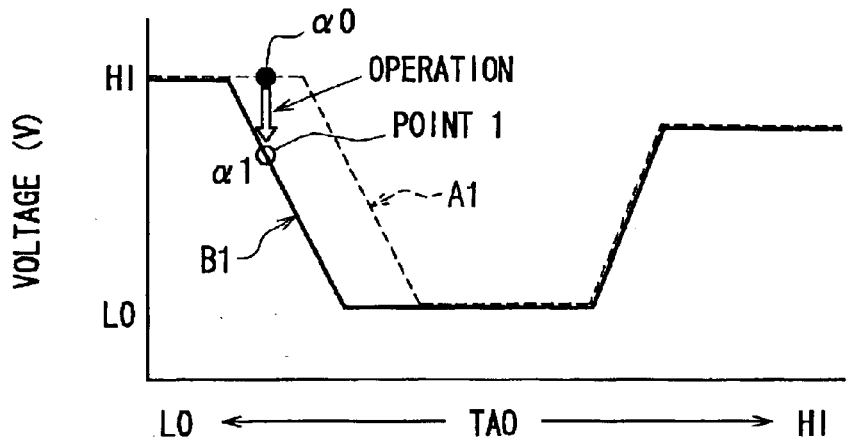
FIG. 6B  2nd OPERATION
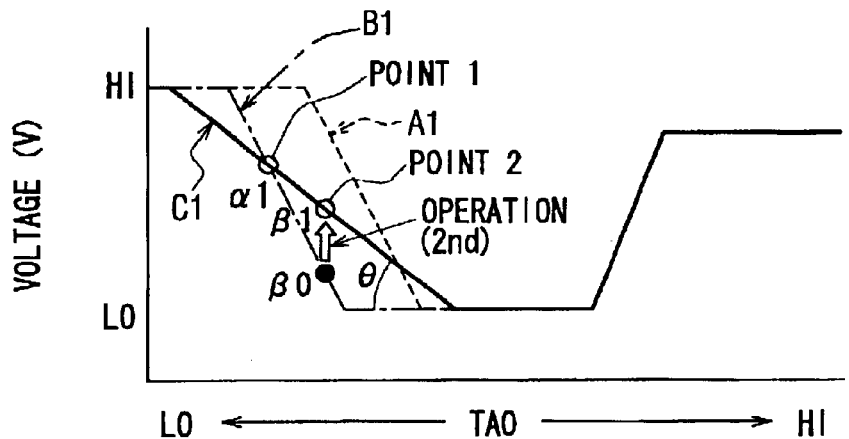
FIG. 6C  3rd OPERATION
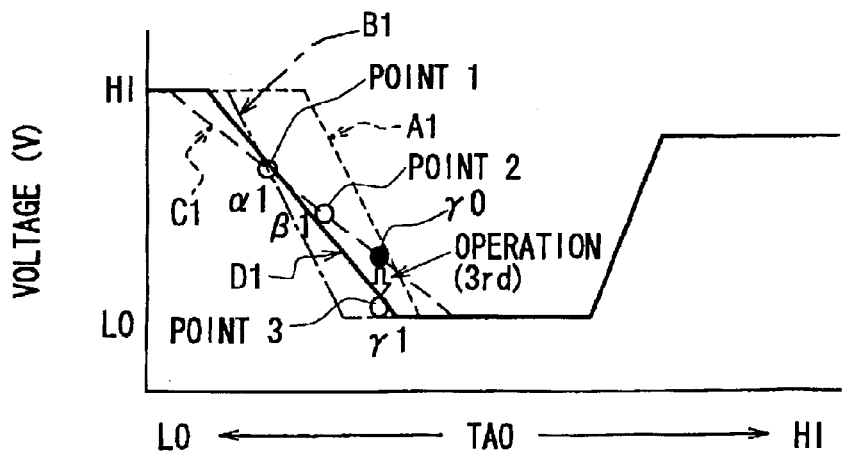

VEHICLE AIR CONDITIONER WITH AUTOMATIC AIR-CONDITIONING CONTROL

CROSS REFERENCE TO RELATED APPLICATION

This application is based upon Japanese Patent Applications No. 2002-3551, filed on Jan. 10, 2002, and No. 2002-18708, filed on Jan. 28, the contents of which are incorporated herein by reference.

BACKGROUND OF THE INVENTION

1. Field of the Invention

The present invention relates to a vehicle air conditioner which has an automatic air-conditioning control function and a learning control function of a passenger's preference for reflecting the passenger's preference to air-conditioning.

2. Related Art

An air conditioner, such as the one described above, has a predetermined control characteristic, and automatically controls the condition inside a vehicle by controlling a blow-out temperature, the amount of the conditioned air blown into a passenger compartment, a sucking air mode and a blow-out mode based on the predetermined control characteristic. In addition, the air conditioner alters the control characteristic based on the information of the operation in air conditioning by the passenger. That is, the air conditioner learns the passenger's preference by activating the learning control function.

An air conditioner, described in JP-A-04-131641, has a memory for memorizing respective control characteristics for respective passengers as a target person for the air-conditioning in the vehicle. The air conditioner recognizes a target passenger for current air-conditioning by using monitor image information, and controls the air-conditioning based on operating information for the air-conditioning by the target passenger that is stored in the memory. Thus, the air conditioner controls the air-conditioning based on each passenger's preference.

These kinds of air conditioners, however, take a relatively long time to learn the passenger's preference when the predetermined control characteristic is significantly different from his/her preference because the passenger has to adjust the amount or the temperature of the air blown into the passenger compartment, or the like, a large number of times until the altered conditioning characteristic becomes close to his/her preference.

Not an air conditioner, but an automatic transmission control unit, described in JP-A-09-210195, has plural preset shift maps, and selects one of them in accordance with the driving operation information by a driver and uses it after the selection. This approach is also not enough to learn the passenger's preference quickly. Moreover, the selected pattern may not be suitable for the preference.

SUMMARY OF THE INVENTION

An object of the invention is to provide an improved vehicle air conditioner that controls air-conditioning based on a control characteristic and that can approach the passenger's preference rapidly.

According to an aspect of the present invention, the air conditioner has a controlling unit for automatically controlling air-conditioning in a vehicle in accordance with a control characteristic. The air conditioner determines the control characteristic as a specific control characteristic from plural control characteristics based on at least one of the personal information of a passenger in the vehicle, the operating information that is caused by the passenger during a predetermined time interval.

The control characteristic may be determined by selecting one from the plural control patterns. The air conditioner can determine the one by selecting based on the personal information or the operating information. Also, the control characteristic may be determined by calculating the personal information or the operating information.

The personal information includes, for example, that the passenger has a long hair, or that the passenger wears contact lenses on his/her eyes. Normally, these people do not prefer the strong stream of the conditioned air blown into the passenger compartment since the strong stream easily causes a disorder of the hair or a dry condition of the contact lenses. Therefore, the air conditioner can determine the control pattern which includes a low amount of air blown into the passenger compartment for those people based on the personal information or the operating information by the passenger.

The personal information of the passenger can be obtained from a passenger's belongings, for example, an electrical communicating means, specifically, a radio communicating means such as a cell phone, a personal digital assistant or the like.

As to the length of the hair of the passenger, the air conditioner can determine the length based on an image recognition of the passenger.

The predetermined time interval described above is, for example, a period in which a predetermined number of days has passed after the user (passenger) purchases the vehicle, or in which the air conditioner has been operated a predetermined number of times after the user purchase the vehicle.

Preferably, the air conditioner learns passenger's preference by altering the selected control pattern based on the operation by the passenger. Learning the passenger's preference starts from the specific control characteristic so that the preference can be realized in a relatively short time.

The specific control characteristic may be cleared by operation of the passenger.

The passenger compartment may have plural distinct zones for air-conditioning. In this case, the air conditioner may determine the respective control patterns for the respective distinct zones to be suitable for the respective passengers.

Preferably, the air conditioner can change the specific control pattern based on the personal information or the operating information by the passenger when the passenger changes.

Before the specific control characteristic is selected from the plural control patterns, the air conditioner controls the air-conditioning based on a standard control characteristic previously set in the air conditioner, and alters the standard control characteristic based on the operation for the air-conditioning by the passenger. After the predetermined time has elapsed, the air conditioner controls the air-conditioning based on the specific control characteristic selected from the plural control patterns and alters the specific control characteristic based on the operation for the air-conditioning by the passenger.

With this feature, the air conditioner can control the air-conditioning using the standard control characteristic while learning the passenger's preference so that the control of the air conditioning gets close to the passenger's preference before the specific control characteristic is determined.

Preferably, the air conditioner informs the passenger that the specific control characteristic is determined.

Preferably, the air conditioner alters a normal control characteristic over a wide range during a predetermined time, and alters the specific control characteristic over a narrow range after the predetermined time has passed.

With this feature, the air-conditioning, just after the vehicle is purchased, is roughly close to the passenger's preference over the wide range, and then, the air-conditioning is close to it over the narrow range so that the passenger's preference is achieved soon.

Other features and advantages of the present invention will become more apparent from the following detailed description made with reference to the accompanying drawings.

BRIEF DESCRIPTION OF THE DRAWINGS

FIG. 6A a diagram showing a relationship between a blower voltage and the TAO before and after the first time learning of the passenger's preference in the first embodiment of the present invention;

FIG. 6B a diagram showing a relationship between a blower voltage and the TAO before and after the second time learning of the passenger's preference in the first embodiment of the present invention;

FIG. 6C a diagram showing a relationship between a blower voltage and the TAO before and after the third time learning of the passenger's preference in the first embodiment of the present invention;

DETAILED DESCRIPTION OF THE PREFERRED EMBODIMENT

Figure 1:
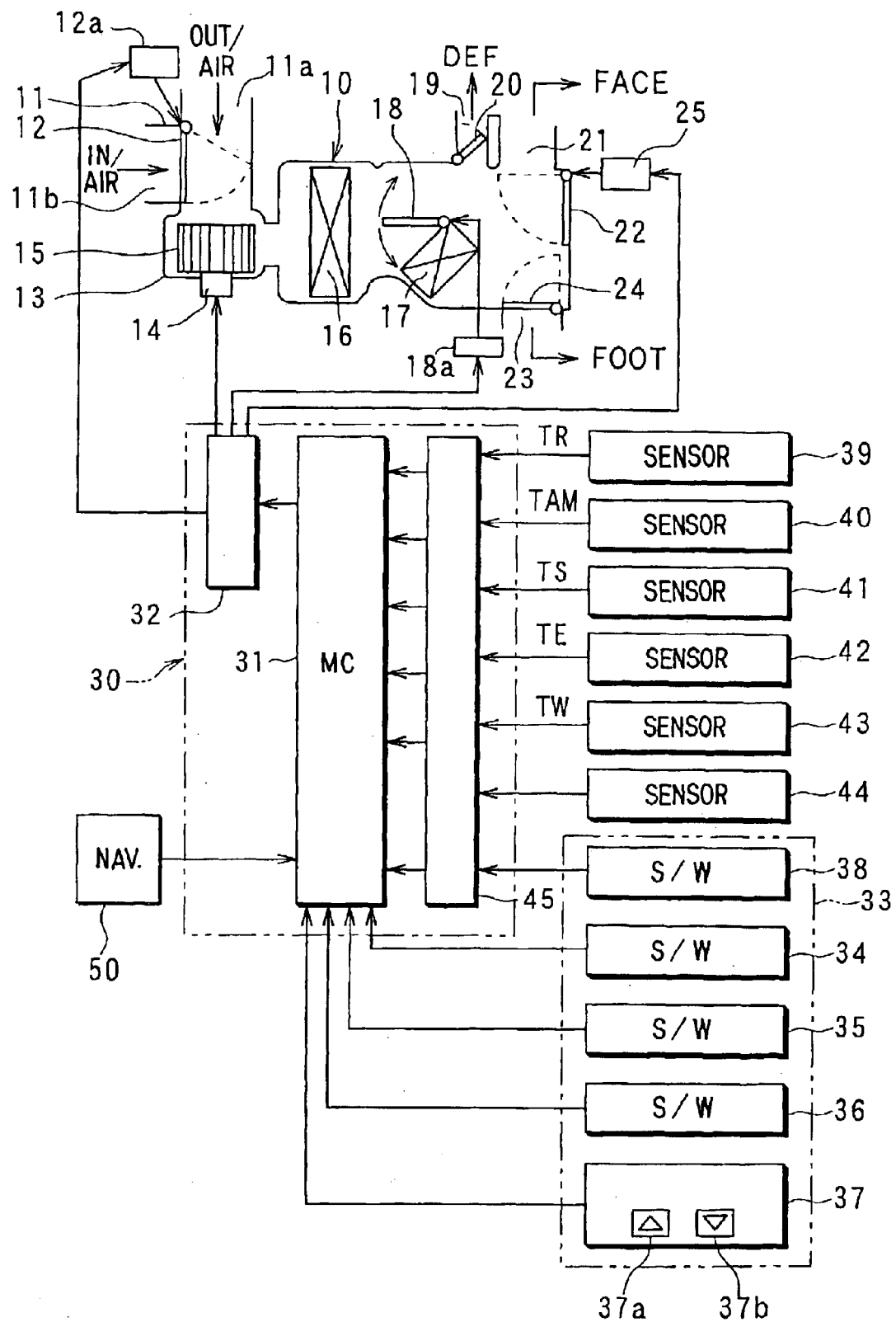
FIG. 1 is a system diagram illustrating a construction of a ventilation system of the present invention.

Specific embodiments of the present invention will now be described hereinafter with reference to the accompanying drawings in which the same or similar component parts are designated by the same or similar reference numerals.
(First Embodiment)

First, a schematic ventilation system in which air is blown toward a passenger compartment of a vehicle will be described with reference to FIG. 1. An air conditioning unit 10 has an inside/outside air switching box 11 in which an outside air inlet 11a for introducing outside air (air from the outside of the vehicle) and an inside air inlet 11b for introducing inside air (air from the passenger compartment). The inside/outside air switching box 11 is provided at the most upstream end of the air conditioning unit 10.

The inside/outside air switching box 11 has an inside/outside switching door 12 rotatably disposed therein between the outside air inlet 11a and the inside air inlet 11b. The inside/outside switching door 12 is driven by an electric-drive apparatus 12a such as a servomotor. The switching door 12 opens and closes the outside air inlet 11a and the inside air inlet 11b to determine from which inlet the air should be introduced or to determine the mixing rate between the air from the outside of the vehicle and the air from the passenger compartment of the vehicle.

An air blower unit 13 is provided at a downstream side of the inside/outside air switching box 11 in the air conditioning unit 10, for blowing air to the downstream side of the air conditioning unit 10. The air blower unit 13 has a blower-driving motor 14 and a centrifugal blower fan 15 connected to a rotor shaft of the blower-driving motor 14. An evaporator 16 and a heater core 17 are arranged in the downstream side of the blower fan 15.

The evaporator 16 is a cooling heat exchanger and constitutes a refrigeration cycle with a compressor driven by an engine (not shown) and the like, for cooling air by absorbing heat from the air coming into the air conditioning unit 10 by causing evaporation of low-pressure coolant. The heater core 17 is a heating heat exchanger, for heating the air using hot water (cooling water) flowing in the engine as a heat source.

An air mix door 18 is rotatably provided at an upstream side of the heater core 17. The air mix door 18 is driven by an actuator 18a to determine an opening degree thereof for adjusting the ratio between the amount of heated air passing through the heater core 17 and the amount of cooled air bypassing the heater core 17, thereby adjusting the temperature of the air blown into the passenger compartment. Namely, the heated air passing through the heater core 17 and the cooled air bypassing the heater core 17 are mixed with each other so as to make air having a temperature indicated by a passenger. Therefore, the air mix door constitutes a temperature adjusting means for the air blown into the passenger compartment.

At the most downstream end of the ventilation passage in the air conditioning unit 10, a blow-out mode switching portion is provided. More specifically, a defroster door 20 for opening and closing a defroster blow-out port 19, a face door 22 for opening and closing a face blow-out port 21 and a foot door 24 for opening and closing a foot blow-out port 23 are provided. These doors 20, 22, 24 are driven by an actuator 25 to determine a blow-out mode of the conditioned air, for example, a FACE mode (FACE), a BI-LEVEL mode (B/L), a FOOT mode (FOOT), a FOOT-DEF mode or a DEFROSTER mode. The conditioned air is blown into the passenger compartment from an opened port according to the blow-out mode.

When the FACE mode is selected, the face blow-out port 21 is fully opened while the defroster blow-out port 19 and the foot blow-out port 23 are closed, thereby blowing out the conditioned air only through the face blow-out port 21 toward an upper body of the passenger in the passenger compartment of the vehicle.

When the BI-LEVEL mode is selected, the face blow-out port 21 and the foot blow-out port 23 are fully opened while the defroster blow-out port 19 is closed, thereby blowing out the conditioned air through the face blow-out port 21 and the foot blow-out port 23 toward the upper body and feet of the passenger in the passenger compartment of the vehicle at the substantially equal amount of the conditioned air.

When the FOOT mode is selected, the foot blow-out port 23 is fully opened while the face blow-out port 21 is closed, and the defroster blow-out port 19 is slightly opened. As a result, the conditioned air is mainly blown toward the feet of the passenger through the foot blow-out port 23 while some of the conditioned air is blown toward an inside part of a windshield of the vehicle through the defroster blow-out port 19.

When the DEFROSTER mode is selected, the defroster blow-out port 19 is fully opened while the face blow-out port 21 and the foot blow-out port 23 are closed, thereby blowing out the conditioned air only through the defroster blow-out port 19 toward the inside part of the windshield of the vehicle.

When the FOOT-DEFROSTER mode is selected, the defroster blow-out port 19 and the foot blow-out port 23 are fully opened while the face blow-out port 21 is closed, thereby blowing out the conditioned air through the defroster blow-out port 19 and the foot blow-out port 23 at substantially the same amount.

An air conditioning control device 30 has a microcomputer 31 as a control means. The amount of the conditioned air blown into the passenger compartment is controlled by determining the revolution speed of the blower motor 14 that is determined by the applied voltage (blower voltage) thereto. The blower voltage is adjusted in accordance with an output signal from the microcomputer 31 through a drive circuit 32. Other actuators 12a, 18a and 25 are also controlled by the drive circuit 32 based on output signals from the microcomputer 31.

The microcomputer 31 has a well-known structure including a CPU, a ROM portion, a RAM portion, a standby RAM portion, an I/O port portion, an A/D converter and the like.

The standby RAM serves as memory means, i.e., a backup memory for storing values (information) that have the passenger's preferences learned through the operations by the passenger even when an ignition switch (hereinafter, referred to as an IG) is turned off the ignition switch changing the status of the engine from an active condition to a non-active condition, and vice versa. The voltage is supplied to the standby RAM directly from a battery equipped in the vehicle, not through the IG even if the IG is turned off. Besides, a backup battery (not shown) is equipped with the vehicle to supply voltage to the microcomputer 31 for a short time in a situation that the microcomputer 31 is disconnected from the battery.

Operational signals are input to the microcomputer 31 that are sent from an air conditioning operational portion 33 arranged on an instrument panel in the passenger compartment. Many kinds of switches are provided in the operational portion 33, such as an AUTO switch 34 for setting an automatic control condition of the air conditioner, an inside/outside air selecting switch 35 for manually selecting a suction mode between an inside air suction mode and an outside air suction mode, a blow-out mode selecting switch 36 for manually selecting the blow-out mode described above, a blowing air amount adjusting switch 37 for manually adjusting the amount of air blown by the fan 15, a temperature setting switch 38 for setting a preferred temperature of the passenger. The temperature setting switch 38 serves as an operational portion operated by the passenger for setting a passenger's desired condition in the air conditioning of the vehicle.

The inside/outside air selecting switch 35, the blow-out mode selecting switch 36, the blowing air amount adjusting switch 37 and the temperature setting switch 38 denote operating means for setting the preferred air-conditioning of the passenger operated by the passenger. The microcomputer 31 changes a control characteristic based on the air-conditioning operating information set by operations at respective switches 35–38 by the passenger. That is, the microcomputer 31 performs a learning control.

The blowing air amount adjusting switch 37 has an up amount switch 37a and a down amount switch 37b both of which are push type switches. The up amount switch 37a outputs an increase signal by which the blower voltage (the voltage supplied to the drive motor 14) is increased by one level that denotes 0.25 volts in every single pushing operation by the passenger. The down amount switch 37b outputs a reduction signal by which the blower voltage is reduced by one level that denotes 0.25 volts in every single pushing operation by the passenger.

The microcomputer 31 receives sensor signals from several sensors each of which detects an environmental condition, i.e., air-conditioning heat load, that influences the air conditioning in the passenger compartment. More specifically, the sensors are an inside air temperature sensor 39 for detecting the temperature (TR) of air inside of the passenger compartment, an outside air temperature sensor 40 for detecting the temperature (TAM) of air outside of the vehicle, a sunlight sensor 41 for detecting the amount of sunlight (TS) incident into the passenger compartment, an evaporator temperature sensor 42 for detecting the temperature (TE) of the evaporator (actually, the temperature of the air immediately after passing through the evaporator), a water temperature sensor 43 for detecting the temperature (TW) of the cooling water circulating in the engine and the heater core 17, a seat sensor 44 as rear seat passenger detecting means which is provided at a rear seat for detecting the presence of a rear seat passenger and the like. The signals from those sensors are input to the microcomputer after being converted by the A/D converter. A signal sent from the temperature setting switch 38 is also input to the microcomputer 31 after its level is converted by a level converter circuit 45.

A vehicle navigation system 50 is connected to the microcomputer 31. The navigation system 50 has a monitor (not shown) to display a current position of the vehicle. The passenger can input his/her personal information such as the length of the hair, his/her age into the microcomputer 31 through a display of the monitor. That is, the navigation system 50 denotes input means for inputting personal information by operations by the passenger.

Figure 2:
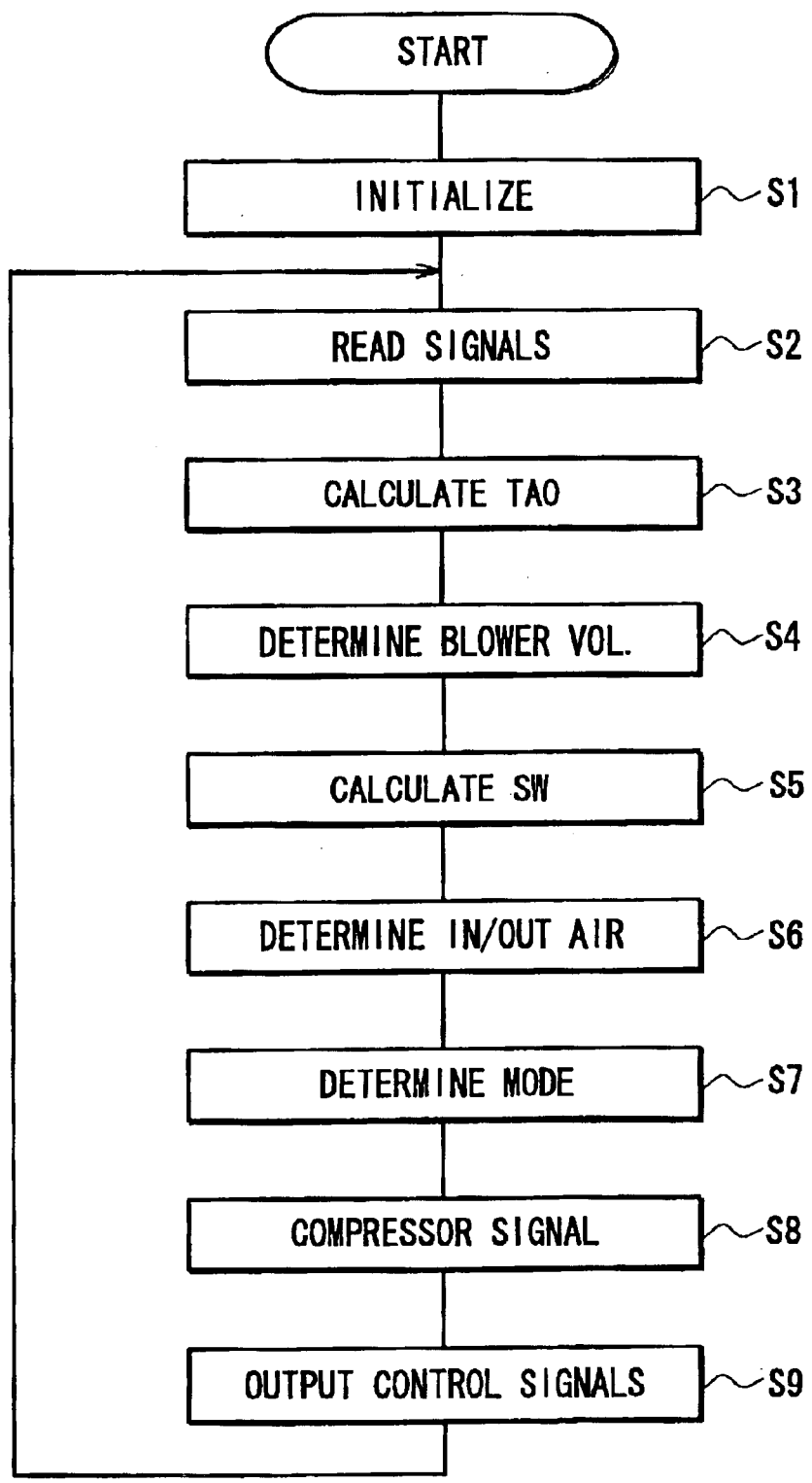
FIG. 2 is a flow chart showing an automatic air conditioning control of the present invention.

Next, a flow chart executed by the microcomputer 31 in this embodiment will be described with reference to FIG. 2.

This flow chart will start by turning on the IG. First of all, every conversion and setting of initial values of flags or the like are executed in step S1. Next, the microcomputer 31 reads the operational signals from the switches 34–38 of the air conditioning operational portion 33 in step S2. Also, the microcomputer 31 reads the detected signals indicative of the environmental conditions of the vehicle from the sensors 39–44 and a signal from the navigation system 50 in step S2.

Next, a target blowing temperature TAO of the air blown into the passenger compartment is calculated in step S3 based on detected signals indicative of the environmental conditions that are read out at the step S2 and a preset temperature TSET by using the following equation 1. The TAO is a necessary air blowing temperature for keeping the passenger compartment at the control preset temperature TSET regardless of change in the environmental condition.

$$TAO=KSET \times TSET - KR \times TR - KAM \times TAM - KS \times TS + C \quad (1)$$

Wherein KSET, KR, KAM and KS represent coefficients, and C represents a correction constant. TSET, TR, TAM, TS represent the control preset temperature, the inside air temperature, the outside air temperature, the sunlight amount as described above, respectively.

Next, the flow continues to step S4, so that a blower voltage for determining the blowing air amount is determined in accordance with the TAO obtained from the above-described equation (1). It is difficult to determine the amount of air blown into the compartment uniformly due to the individual differences of the passenger. Accordingly, in this embodiment, the microcomputer 31 alters a blower voltage calculation map as a blowing air amount control characteristic based on a manual operation by the passenger with respect to the amount of the air blown into the passenger compartment, so that the blower voltage map becomes the one which learns the passenger's preference.

Moreover, microcomputer 31 can determine a blower voltage calculation pattern based on the personal information. More specifically, the microcomputer 31 has plural blower voltage calculation maps, and selects one of them according to the personal information of the passenger or calculation so as to determine the blower voltage based on the selected blower voltage calculation map. The maps will be described in detail later. Also, the microcomputer 31 can determine the blower voltage calculation pattern by calculation using the personal information.

Next, the flow continues to step S5 to calculate a target opening degree SW of the air mix door 18 based on the TAO described above, TE and TW.

Next, the flow will continue to step S6 to determine the inside/outside air suction mode of the sucking ratio between the inside air and the outside air that is adjusted by the inside/outside-air switching door 12 based on the TAO. Then, the flow will continue to step S7 to determine the blow-out mode that is achieved with the blow-out mode doors 20, 22 and 24 based on the TAO. Then, in next step S8, the control for the compressor is determined so that the evaporator temperature TE is kept at a target temperature of the evaporator. The calculation for the blow-out mode based on the TAO may be conducted between steps S3 and S4.

After that, the flow will continue to step S9 to control an activation in each actuator 12a, 18a and 25 and the compressor in addition to the revolution rate of the blower motor 14 by supplying control signals to them through the drive circuit 32 that are obtained at each step S4 to S8 described above. The flow will return to step S2 after finishing step S9 to repeat the above-described steps.

Figure 3:
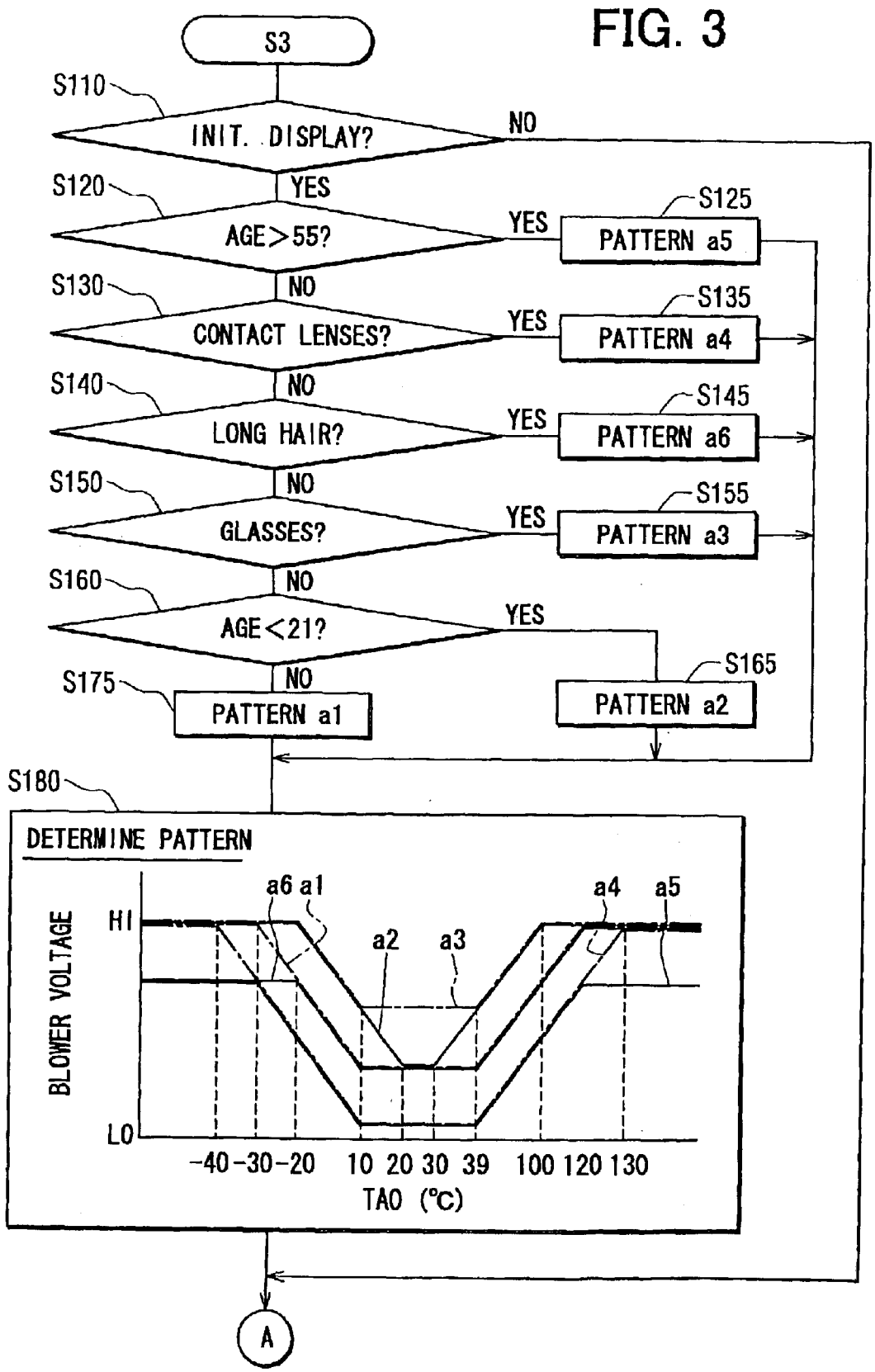
FIG. 3 is a flow chart showing the determination of a specific control characteristic from plural control characteristics regarding a blower voltage calculation map in a first embodiment of the present invention.

Next, the determination for the blower voltage in step S4 shown in FIG. 2 will be described in detail with reference to FIGS. 3 and 4. One pattern among patterns a1 to a6 as the blower voltage calculation maps, which is shown in step S180 in FIG. 3, is selected based on the personal information of the passenger. The blower voltage maps shown as the patterns a1 to a6 are provided in every blow-out mode. The blower voltage maps are provided previously before the passenger operates the blowing air amount adjusting switch 37 for the first time.

Incidentally, the selected pattern may be obtained by calculating the personal information. The selected pattern obtained by calculation may be the same as one shown in step S180.

The pattern a1 denotes an average characteristic in the amount of the blowing air. The pattern a2 denotes a relatively high characteristic in the amount of the blowing air so that the amount of the blowing air is more than that in the pattern a1 at an intermediate temperature range of the TAO. The pattern a3 denotes the highest characteristic in the amount of the blowing air so that the amount of the blowing air is more than that in the pattern a2 at a temperature range between 10 to 39 Celsius of the TAO. The pattern a4 denotes a relatively low characteristic in the amount of the blowing air so that the amount of the blowing air is less than that in the pattern a1 at an intermediate temperature range of the TAO. The pattern a5 denotes the lowest characteristic in the amount of the blowing air so that the amount of the blowing air is less than that in the pattern a1 at the whole range between for the TAO. The pattern a6 denotes a slightly lower characteristic in the amount of the blowing air so that the amount of the blowing air is less than that in the pattern a1 at a low temperature range of the TAO.

In FIG. 3, it is determined whether or not an air-conditioning initial setting display is selected on the monitor of the navigation system 50 at step S110. The initialization for the air-conditioning is performed when the vehicle is driven for the first time or the passenger changes. In the air-conditioning initial setting display, the personal information, such as the length of the hair, his/her age or the like, is input in the manner that the passenger answers the questions shown on the display of the navigation system. In each step S120, S130, S140, S150 and S160, the determination is conducted based on the personal information.

When an air-conditioning initial setup is selected and the determination of step S110 is "YES", the flow will continue to step S120. In this step, it is determined whether or not the passenger is an elderly person who is equal to or older than 55. When the passenger is determined as the elderly person, the determination of step S120 is "YES", the flow will continue to step S125. Since the elderly person usually dislikes feeling the wind speed of the conditioned air blown into the passenger compartment, the pattern a5, i.e., the lowest amount of the blowing air is selected in step S125 from the blower voltage calculation maps.

When the determination of step S120 is "NO", the flow will continue to step S130 to determine whether or not the passenger wears contact lenses. When the determination of step S130 is "YES", the flow will continue to step S135. It is likely that eyes will dry out soon when wearing the contact lenses. Therefore, the pattern a4, i.e., the relatively low amount of the blowing air is selected.

When the determination of step S130 is "NO", the flow will continue to step S140 to determine whether or not the passenger has long hair. When the passenger has long hair, the determination of step S140 is "YES", the flow will continue to step S145. It is likely that a person who has long hair dislikes the hair being blown. Therefore, the pattern a6, i.e., the slightly low amount of the blowing air is selected.

When the determination of step S140 is "NO", the flow will continue to step S150 to determine whether or not the passenger wears glasses or whether or not the passenger does not put the blow-out direction of the conditioned air toward him/herself. When the determination of step S150 is "YES", the flow will continue to step S155. It is likely that a person who wears glasses does not feel the dry of his/her eyes, and likely wants to feel the conditioned air blown toward him/herself. Therefore, the pattern a3, i.e., the highest amount of the blowing air is selected. This selection is also applicable to a person who does not put the blow-out direction of the conditioned air toward him/herself because the strong wind of the conditioned air helps the person feel the air-conditioning with the air strongly blown into the passenger compartment.

When the determination of step S150 is "NO", the flow will continue to step S160 to determine whether or not the passenger is a young person who is younger than 21. When the passenger is the young person, the determination of step S160 is "YES", the flow will continue to step S165. It is likely that the young person likes to feel the wind speed of the conditioned air blown into the passenger compartment. Therefore, the pattern a2, i.e., the relatively higher amount of the blowing air is selected.

When the determination of step S160 is "NO", the flow will continue to step S170 to select the pattern a1, i.e., the average amount of the blowing air.

Then, the flow continues to step S180 to determine the control pattern, which is selected from patterns a1 to a6 according to the preceding steps, as a blower voltage calculation map to determine the blower voltage and as a basis (specific) blower voltage calculation map to learn the passenger's preference. The blower voltage calculation maps are provided in each blow-out mode. Therefore, one of, for example, six blower voltage calculation maps is chosen in each blow-out mode.

Figure 4:
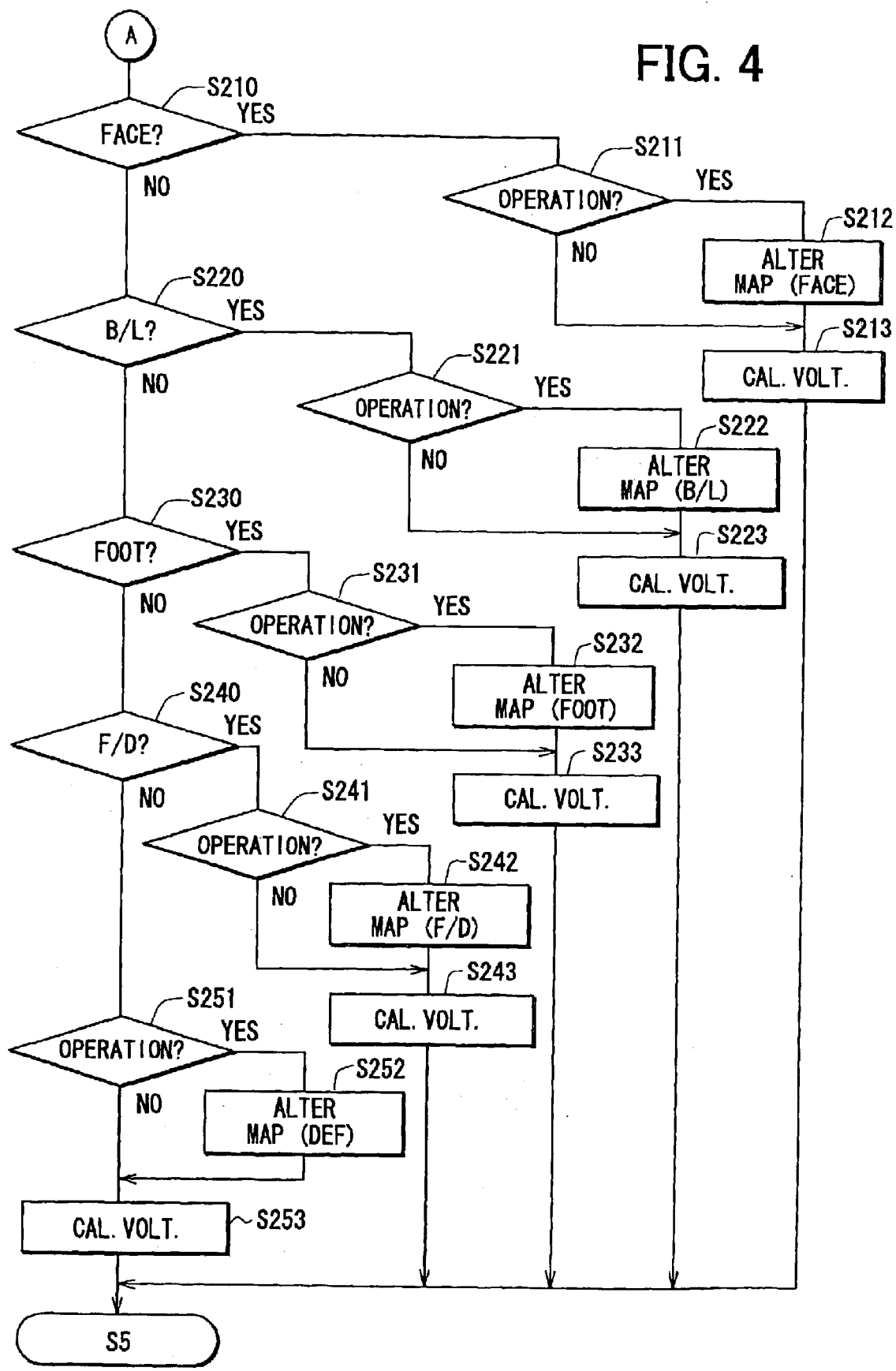
FIG. 4 is a flow chart showing the learning of the passenger's preference in every blow-out mode in the first embodiment of the present invention.

After the procedures shown in FIG. 3, the procedures shown in FIG. 4 will be performed. The blower voltage calculation map is altered according to the operation by the passenger, and the blower voltage is determined based on the TAO. In step S210, it is determined whether or not the blow-out mode is currently the FACE mode. When the mode is FACE mode, the determination in step S210 is "YES", and the flow will continue to step S211 to determine whether or not the passenger manually has changed the amount of the conditioned air blown into the passenger compartment by operating the blowing air amount adjusting switch 37. When the amount of the conditioned air blown into the passenger compartment is changed manually by the passenger, the determination in step S211 is "YES", and the flow will continue to step S212.

Figure 5A:
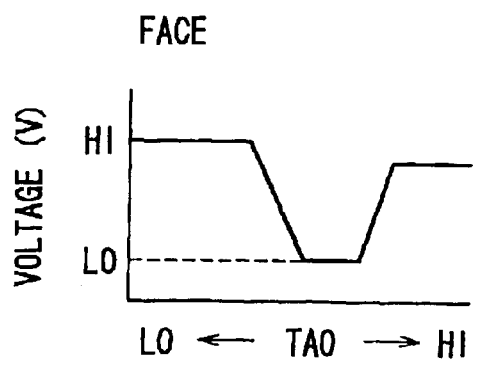
FIGS. 5A through 5E, respectively, is a diagram showing a relationship between a blower voltage and the TAO in every blow-out mode in the first embodiment of the present invention.

In step S212, the blower voltage calculation map of the FACE mode, which is shown in FIG. 5A, is changed to learn the passenger's preference based on the operation of the blowing air amount adjusting switch 37. The blower voltage calculation map in this case is selected at step S180 in FIG. 3 as the one for the FACE mode. Then, the flow will continue to step S213 to calculate the blower voltage using the TAO based on the lower voltage calculation map in the FACE mode. When the determination in step S211 is "NO", the flow immediately continues to step S213 to calculate it.

When the determination in step S210 is "NO", the flow will continue to step S220 to determine whether or not the blow-out mode is currently the BI-LEVEL mode. When the mode is the BI-LEVEL (B/L) mode, the determination in step S220 is "YES", the flow will continue to step S221 to determine whether or not the passenger has changed manually the amount of the conditioned air blown into the passenger compartment by operating the blowing air amount adjusting switch 37. In a case where he/she has manually changed the amount of the conditioned air, the determination in step S221 is "YES" so that the flow continues to step S222.

Figure 5B:
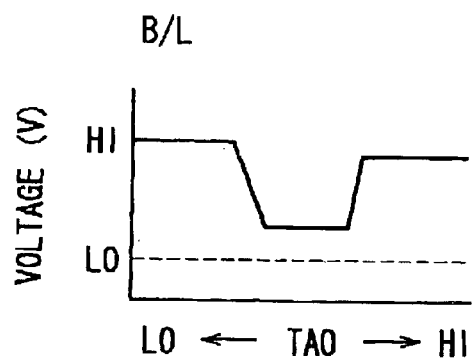

In step S222, the blower voltage calculation map of the BI-LEVEL mode, which is shown in FIG. 5B, is changed to learn the passenger's preference based on the operation of the blowing air amount adjusting switch 37. The blower voltage calculation map in this case is selected at step S180 in FIG. 3 as the one for the BI-LEVEL mode. Then, the flow will continue to step S223 to calculate the blower voltage using the TAO based on the lower voltage calculation map of the BI-LEVEL mode. When the determination in step S221 is "NO", the flow immediately continues to step S223 to calculate it.

When the determination in step S220 is "NO", the flow will continue to step S230 to determine whether or not the blow-out mode is currently the FOOT mode. When the mode is the FOOT mode, the determination in step S230 is "YES", the flow will continue to step S231 to determine whether or not the passenger has manually changed the amount of the conditioned air blown into the passenger compartment by operating the blowing air amount adjusting switch 37. In a case where he/she has manually changed the amount of the conditioned air, the determination in step S231 is "YES" so that the flow continues to step S232.

Figure 5C:
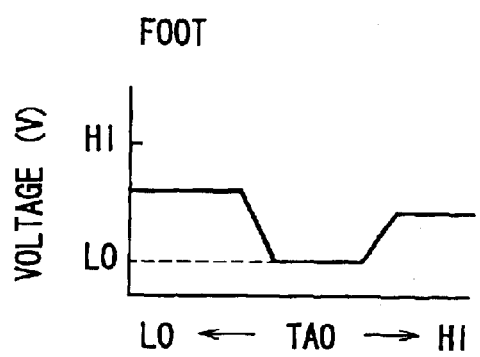

In step S232, the blower voltage calculation map of the FOOT mode, which is shown in FIG. 5C, is changed to learn the passenger's preference based on the operation of the blowing air amount adjusting switch 37. The blower voltage calculation map in this case is selected at step S180 in FIG. 3 as the one for the FOOT mode. Then, the flow will continue to step S233 to calculate the blower voltage using the TAO based on the lower voltage calculation map in the FOOT mode. When the determination in step S231 is "NO", the flow immediately continues to step S233 to calculate it.

When the determination in step S230 is "NO", the flow will continue to step S240 to determine whether or not the blow-out mode is currently the FOOT/DEF (F/D) mode. When the mode is the FOOT/DEF mode, the determination in step S240 is "YES", the flow will continue to step S241 to determine whether or not the passenger has manually changed the amount of the conditioned air blown into the passenger compartment by operating the blowing air amount adjusting switch 37. In a case where he/she has manually changed the amount of the conditioned air, the determination in step S241 is "YES" so that the flow continues to step S242.

Figure 5D:
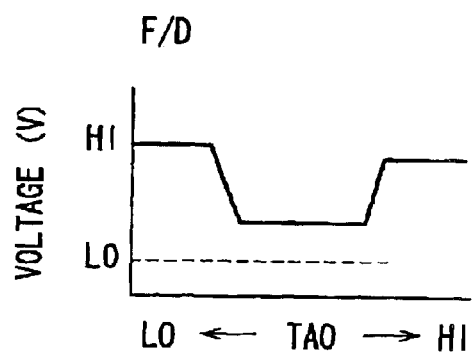

In step S242, the blower voltage calculation map of the FOOT/DEF mode, which is shown in FIG. 5D, is changed to learn the passenger's preference based on the operation of the blowing air amount adjusting switch 37. The blower voltage calculation map in this case is selected at step S180 in FIG. 3 as the one for the FOOT/DEF mode. Then, the flow will continue to step S243 to calculate the blower voltage using the TAO based on the lower voltage calculation map in the FOOT/DEF mode. When the determination in step S241 is "NO", the flow immediately continues to step S243 to calculate it.

When the determination in step S240 is "NO", the flow will continue to step S251. The current blow-out mode is the DEF mode when the flow continues to step S251 in response to the result of determining for the current mode in steps S210 to 240. In step S241, it is determined whether or not the passenger has manually changed the amount of the conditioned air blown into the passenger compartment by operating the blowing air amount adjusting switch 37. In a case where he/she has manually changed the amount of the conditioned air, the determination in step S251 is "YES" so that the flow continues to step S252.

Figure 5E:
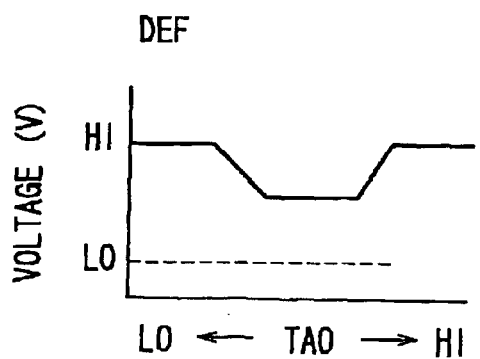

In step S242, the blower voltage calculation map of the DEF mode, which is shown in FIG. 5E, is changed to learn the passenger's preference based on the operation of the blowing air amount adjusting switch 37. The blower voltage calculation map in this case is selected at step S180 in FIG. 3 as the one for the DEF mode. Then, the flow will continue to step S253 to calculate the blower voltage using the TAO based on the lower voltage calculation map in the FOOT/DEF mode. When the determination in step S251 is "NO", the flow immediately continues to step S253 to calculate it.

As described above, the passenger's preference can be learned by altering the blower voltage calculation map corresponding to each mode in respective step S212, S222, S232, S242, S252 based on the operation of the blowing air amount adjusting switch 37 by the passenger.

The concrete learning for the blower voltage calculation map in, for example, step S212, will be described with reference to FIGS. 6A–6C. The control characteristic A1 shown in FIG. 6A is the blower voltage calculation map determined at step S180. When the operation by the passenger regarding the amount of the conditioned air blown into the passenger compartment has never been learned, the blower voltage is obtained by using this map A1.

When the passenger operates the blowing air amount adjusting switch 37 the first time so that the blower voltage is lowered from an $\alpha 0$ level (maximum amount of the blown air) to an operating point $\alpha 1$ level, this operation is learned so that an inclined portion of the control characteristic A1 is translated parallel to the left side in FIG. 6A (a lower temperature side of the TAO). A control characteristic B1 shows the characteristic after learning the first passenger's operation.

As shown in FIG. 6B, when the blower voltage is raised from a $\beta 0$ level (small amount of the blown air close to a minimum amount of the blown air Lo) in the characteristic B1 after the first learning to an operating point $\beta 1$ level in association with a second operation by the passenger, an inclination $\theta$ of the control characteristic is changed so as to be defined by both operating points $\alpha 1$ and $\beta 1$. A control characteristic C1 shows the characteristic after learning the second passenger's operation.

As shown in FIG. 6C, when the blower voltage is lowered from a $\gamma 0$ level (the amount between the minimum amount of the blown air Lo and the amount of the operating point $\beta 1$) in the characteristic C1 after the second learning to an operating point $\gamma 1$ level, i.e., the Lo level in association with a third operation by the passenger, an inclination $\theta$ of the control characteristic C1 is changed so as to be the one obtained by a least squares approach with the operating points $\alpha 1$, $\beta 1$ and $\gamma 1$. Therefore, the characteristic after learning the third passenger's operation is a control characteristic D1 shown in FIG. 6C. In a passenger's operation of more than 3 times, an inclination of the characteristic is changed by a least squares approach with the operating points.

In this embodiment, the air conditioner, which automatically controls the amount of the blown air according to the control characteristic, has plural control characteristics as the control characteristic for the amount of the blown air. In addition, the air conditioner selects the most suitable one for the passenger from the plural control characteristics according to the personal information of the passenger such as his/her age or the like. Therefore, the air-conditioning is performed, which is supposed to be close to the one suitable for the passenger's preference.

Moreover, learning of the passenger's preference is conducted using the characteristic selected according to the passenger's information that is supposed to be close to the passenger's preference. Therefore, the control characteristic can be modified relatively quickly to the one which is the most suitable for the passenger's preference by the small amount of times of an operation by the passenger. Or, the passenger might need not alert the selected control characteristic since it is selected based on the passenger's information to get close to his/her preference.

(Second Embodiment)

Figure 7:
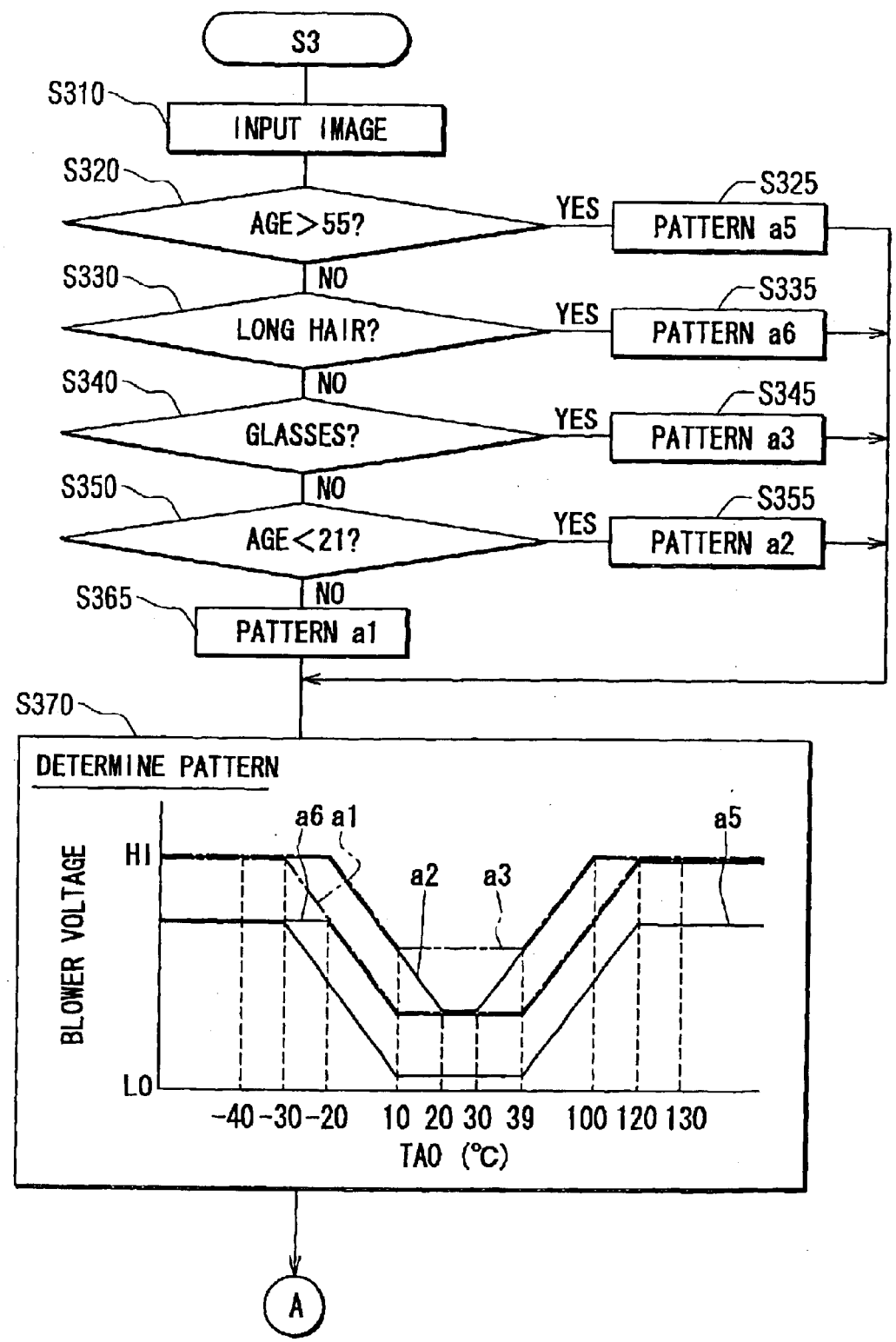
FIG. 7 is a flow chart showing the determination of a specific control characteristic from plural control characteristics regarding a blower voltage calculation map in a second embodiment of the present invention.

In this embodiment, the age of the passenger or the like is presumed using an image analysis. For achieving the analysis, the process shown in FIG. 3 is modified to that shown in FIG. 7. In this embodiment, the air conditioner has an image recognition device (not shown) such as a CCD camera to output image signals of a passenger in a vehicle. The other features are the same as those of the first embodiment.

The age of the passenger or the like is presumed by analyzing the image signals input from the image recognition device at step S310. Then, the flow will continue based on the presumed personal information as follows.

In step S320, it is determined whether or not the passenger is an elderly person who is equal to or older than 55. When the passenger is determined as the elderly person, the determination of step S320 is "YES", the flow will continue to step S325. The pattern a5, i.e., the lowest amount of the blown air is selected in step S325 among the blower voltage calculation maps.

When the determination of step S320 is "NO", the flow will continue to step S330 to determine whether or not the passenger has long hair. When the passenger has long hair, the determination of step S330 is "YES", the flow will continue to step S335. The pattern a6, i.e., the slightly low amount of the blowing air is selected.

When the determination of step S330 is "NO", the flow will continue to step S340 to determine whether or not the passenger wears glasses. When the determination of step S340 is "YES", the flow will continue to step S345. The pattern a3, i.e., the highest amount of the blowing air is selected.

When the determination of step S340 is "NO", the flow will continue to step S350 to determine whether or not the passenger is a young person who is younger than 21. When the passenger is the young person, the determination of step S350 is "YES", the flow will continue to step S355. The pattern a2, i.e., the relatively high amount of the blowing air is selected.

When the determination of step S350 is "NO", the flow will continue to step S365 to select the pattern a1, i.e., the average amount of the blowing air.

Then, the flow continues to step S370 to determine the control pattern, which is selected from patterns a1 to a6 according to the preceding steps, as a blower voltage calculation map to determine the blower voltage and as a basis blower voltage calculation map to learn the passenger's preference. Then, the processes shown in FIG. 4 are performed.

In this embodiment, in addition to the effect in the first embodiment, the image analysis is used for getting passenger's information without inputting it so as to be convenient for the passenger.

The presumption of the passenger can be conducted automatically when the passenger changes from one to the other. Especially, when the car is a company-owned car which is usually used by a different person of the company, it is useful to apply the automatic setting of the air-conditioning, since the air conditioner can choose the most suitable blower voltage calculation map for each driver by using the image analysis without the operation by the driver.

(Third Embodiment)

Figure 8:
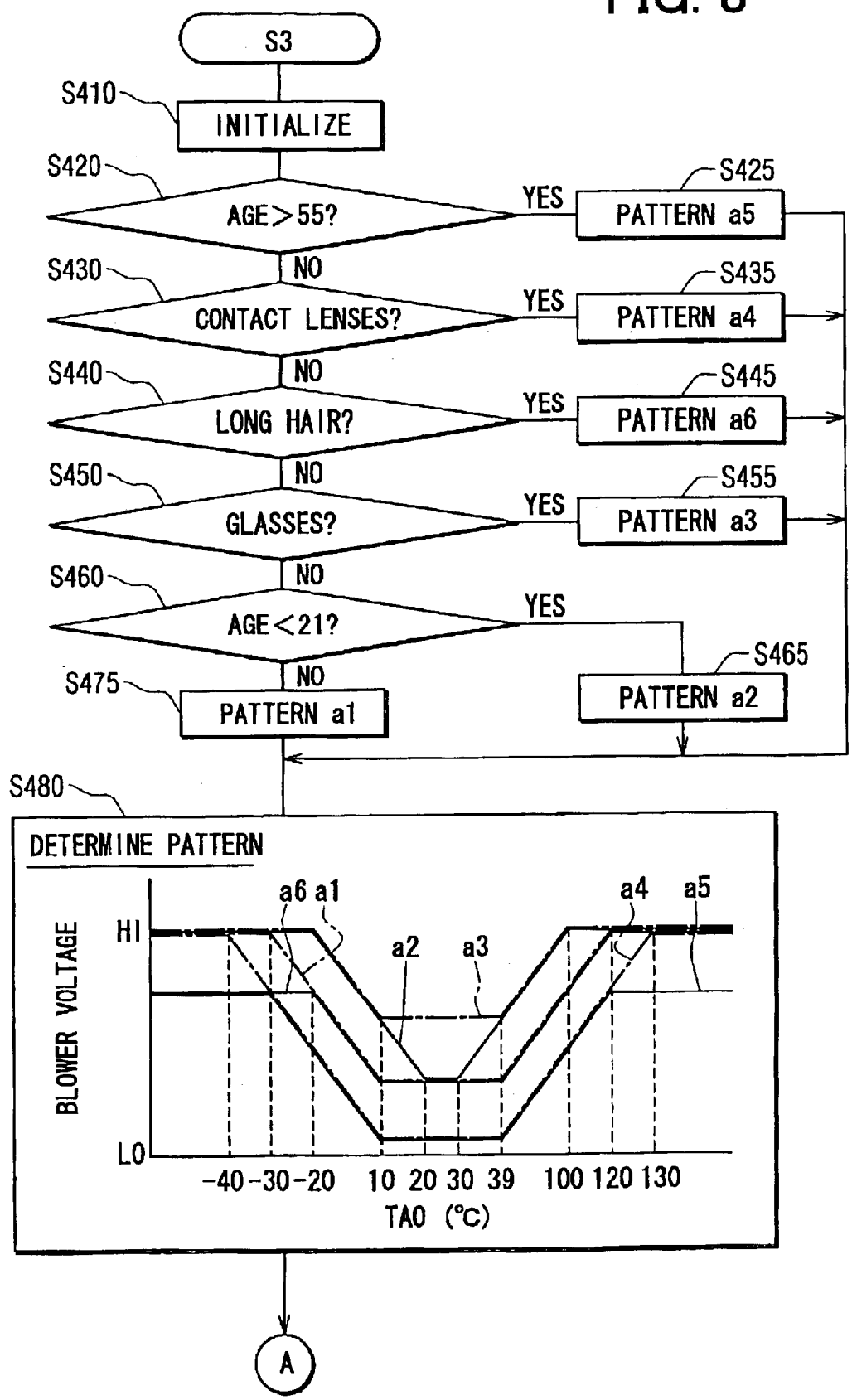
FIG. 8 is a flow chart showing the determination of a specific control characteristic from plural control characteristics regarding a blower voltage calculation map in a third embodiment of the present invention.

In this embodiment, a control characteristic, which is supposed to be the most suitable for a passenger, may be selected by obtaining the passenger's information from a passenger's belongings containing it. The process shown in FIG. 3 is modified to that shown in FIG. 8. A receiver is provided so as to be connected to the air conditioner for receiving the personal information of the passenger from the belongings such as a cell phone, a PDA or the like. The other features are the same as those of the first embodiment.

When an air-conditioning initial setup is selected at step S410, the age of the passenger, the length of passenger's hair or the like is input by communicating with the passenger's belongings. Then, the flow will continue based on the input personal information as follows.

In step S420, it is determined whether or not the passenger is an elderly person who is equal to or older than 55. When the passenger is determined as the elderly person, the determination of step S420 is "YES", the flow will continue to step S425. The pattern a5, i.e., the lowest amount of the blown air is selected in step S425 among the blower voltage calculation maps.

When the determination of step S420 is "NO", the flow will continue to step S430 to determine whether or not the passenger wears contact lenses. When the determination of step S430 is "YES", the flow will continue to step S435. The pattern a4, i.e., the relatively lower amount of the blowing air is selected.

When the determination of step S430 is "NO", the flow will continue to step S440 to determine whether or not the passenger has long hair. When the passenger has long hair, the determination of step S440 is "YES", the flow will continue to step S445. The pattern a6, i.e., the slightly lower amount of the blowing air is selected.

When the determination of step S440 is "NO", the flow will continue to step S450 to determine whether or not the passenger wears glasses. When the determination of step S450 is "YES", the flow will continue to step S455. The pattern a3, i.e., the highest amount of the blowing air is selected.

When the determination of step S450 is "NO", the flow will continue to step S460 to determine whether or not the passenger is a young person who is younger than 21. When the passenger is the young person, the determination of step S460 is "YES", the flow will continue to step S465. The pattern a2, i.e., the relatively high amount of the blowing air is selected.

When the determination of step S460 is "NO", the flow will continue to step S475 to select the pattern a1, i.e., the average amount of the blowing air.

Then, the flow continues to step S480 to determine the control pattern, which is selected among patterns at a1 to a6 according to the preceding steps, as a blower voltage calculation map to determine the blower voltage and as a basis blower voltage calculation map to learn the passenger's preference. Then, the processes shown in FIG. 4 are performed.

In this embodiment, in addition to the effect in the first embodiment, receiving the personal information from the passenger's belongings such as the cell phone or the like allows the passenger not input it by him/herself.

(Fourth Embodiment)

Figure 9:
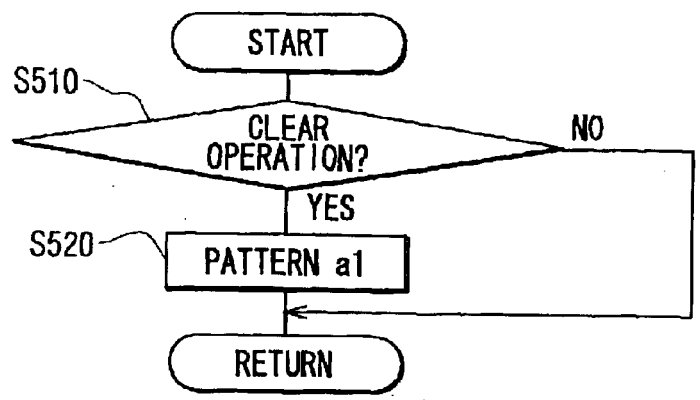
FIG. 9 is a flow chart showing the clearing of the pattern in a fourth embodiment of the present invention.

In this embodiment, the selected control characteristic can be cleared by the instruction of the passenger when the preference of the passenger changes significantly. To accomplish this, the process shown in FIG. 9 is added to the flow described in, for example, the first embodiment. The air conditioner has a clear switch (not shown) to clear the selected characteristic. The other features are the same as those of the first embodiment.

In step S510, it is determined whether or not the passenger has operated the clear switch to clear the blower voltage calculation map that has already been selected. It is supposed that the clear switch is operated in a case where the passenger's preference changes significantly because, for example, the passenger changes his/her hair style, or the passenger changes from glasses to contact lenses. When the clear switch is operated, the determination at step S510 is "YES", the flow will continue to step S520.

In step S520, the blower voltage calculation map, which has already been selected, is cleared, and the averaged characteristic pattern a1 is selected as a blower voltage calculation map for determining the blower voltage after that. The pattern a1 is also used as a basis for learning the passenger's preference.

According to this embodiment, the selected control characteristic is cleared when the preference for the control characteristic is changed so that learning of the passenger's preference is restarted using a newly selected control characteristic as the basis. Therefore, the control characteristic can be modified relatively soon to the one which is the most suitable for the passenger's preference by the small amount of times of an operation by the passenger.

In the above-described embodiments, one map is selected from the group of the blower voltage calculation maps according to the passenger's information. However, the other determination can be applied as follows. First, a standard pattern for the blower voltage calculation map is selected as a basis control characteristic. Then, the blower voltage calculation map, which is supposed to be the most suitable for the passenger, is obtained by calculating the basis control characteristic in light of the passenger's information. Or, the blower voltage calculation map, which is supposed to be the most suitable for the passenger, is obtained by simply calculating the passenger's information.

This invention can be applied to an air conditioner which controls the air-conditioning in each air-conditioning zone independently in a vehicle. Each one may be selected from the blower voltage calculation maps in every air-conditioning zone based on the information of each passenger sitting in each air-conditioning zone. Even when fellow passengers ride in the vehicle with the owner driver in a situation where the blower voltage calculation maps in all air-conditioning zones are the same as one having the preference of the owner driver, the blower voltage calculation map, which is the most suitable for each passenger, can be selected in each zone. Therefore, the air-conditioning can be performed to match with the passenger's preference in each zone without frequent operations by each passenger.

(Fifth Embodiment)

In this embodiment, a different control of the air-conditioning will be described with reference to FIG. 10. Similar to the first embodiment, one map is selected from blower voltage calculation maps shown in step S660 in FIG. 10 according to the operating information by a passenger during a predetermined time. Each blow-out mode has these previously-prepared maps. These maps are a basis for learning the passenger's preference.

Figure 10:
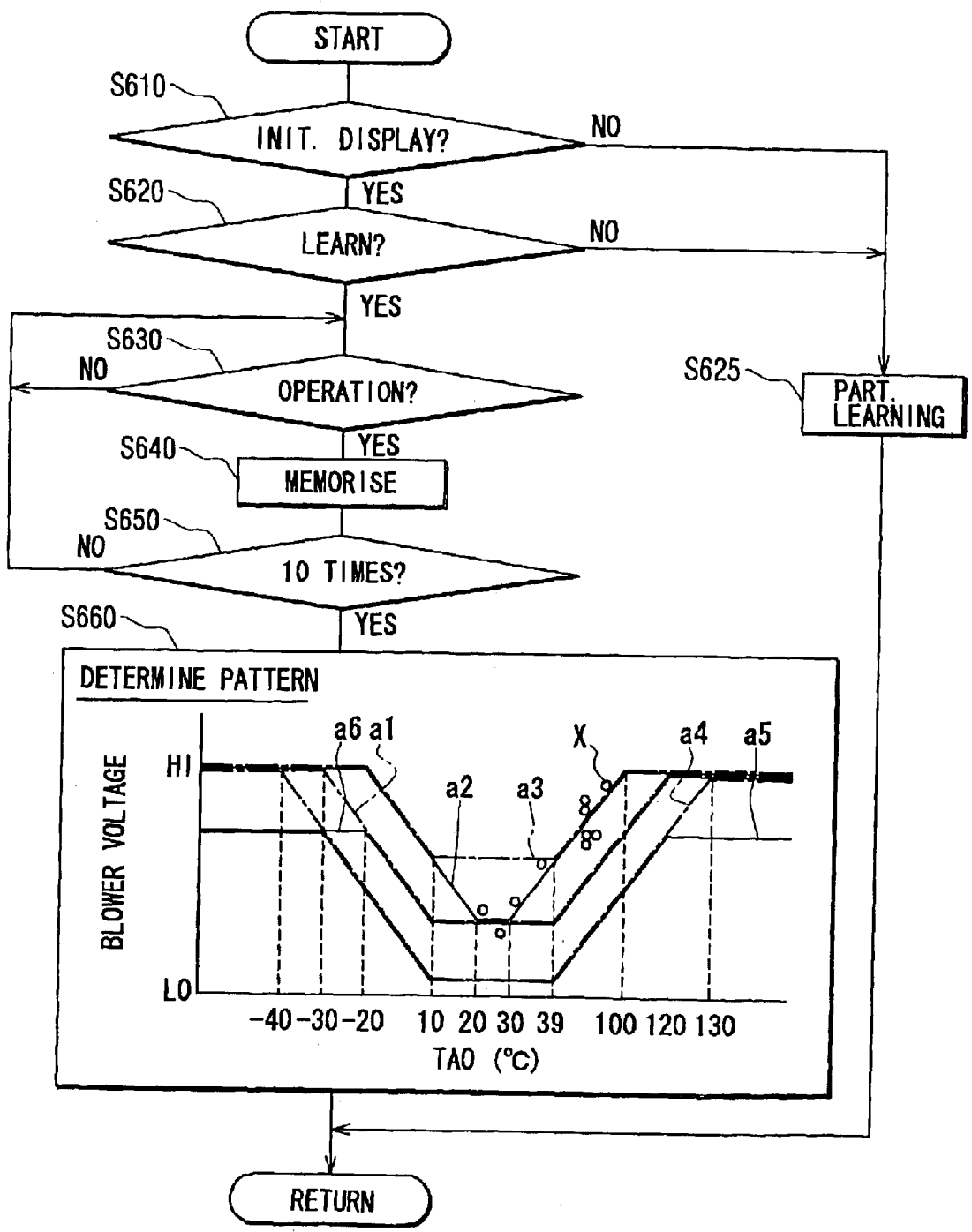
FIG. 10 is a flow chart showing the determination of a specific control characteristic from plural control characteristics regarding a blower voltage calculation map in a fifth embodiment of the present invention.

In FIG. 10, it is determined whether or not an air-conditioning initial setting display is selected on the monitor of the navigation system 50 at step S610. When the air-conditioning initial setting display is on the monitor, the determination at step S610 is "YES", and then, the flow will continue to step S620.

In step S620, it is determined whether or not the passenger has indicated the start for learning the passenger's preference. When the start for the learning is indicated, the determination in step S620 is "YES", and the flow will continue to step S630.

In step S630, it is determined whether or not the passenger has manually changed the amount of the conditioned air blown into the passenger compartment by operating the blowing air amount adjusting switch 37. When the amount of the blown air is changed manually by the passenger, the determination in step S630 is "YES", and the flow will continue to step S640.

In step S640, the air conditioner memorizes the information at the operating point indicated by the blowing air amount adjusting switch 37, i.e., the air-conditioning operating information regarding the amount of the blown air. More specifically, the blower voltage set by the blowing air amount adjusting switch 37 and the TAO at that time are recorded.

Then, the flow will continue to step S650. The determination in step S650 is "NO" until the number of times of an operation to change the amount of the blown air reaches 10 times. In this case, the steps S630 and S640 are repeated. When the number of times of the operation to change the amount of the blown air exceeds 10 times, the determination in step S650 is "YES", the flow will continue to step S660.

In step S660, the blower voltage calculation map, which is presumed to be the one closest to the passenger's preference, is selected among patterns a1 to a6 of blower voltage calculation maps based on the information of the ten operating points recorded at step S640.

The selection is performed as follows. The "o"s shown in step S660 denote ten operating points recorded at step S640. For example, an operating point X in step S660 is the closest to the patterns a2 and a3 among all patterns. Then, the operating point X is closer to the patterns a1 and a6 than the remaining patterns. In this case, a ten-point is applied to each of the patterns a2 and a3, and a five-point is applied to each of the patterns a1 and a6. Likewise, each pattern is applied with some points with respect to the other operating points. Finally, the blower voltage calculation map of the pattern which has the highest point value is selected. The selected blower voltage calculation map is a basis for learning the passenger's preference. Incidentally, the blower voltage calculation maps in the patterns a1 to a6 are the same those shown in step S180 in FIG. 3 described above.

On the other hand, when the determinations in steps S610 and S620 are "NO", that is, the air-conditioning initial setting display is not selected, or when the start of learning of the passenger's preference is not indicated, a normal partial learning is performed at step S625. In this embodiment, the partial learning is conducted through the flow similar to the one shown in FIG. 4, i.e., the whole steps shown in FIGS. 4, 5A–5E and 6A–6C described above. Therefore, the description will be omitted here.

In this embodiment, the air conditioner, which automatically controls the amount of the blown air according to the blower voltage calculation map, learns the passenger's preference by altering the blower voltage calculation map. The air conditioner presumes the passenger's preference based on the air-conditioning operating information during the predetermined time, and selects the one as the basis map, which is supposed to be the most suitable for the passenger's preference, among the plural blower voltage calculation maps. Therefore, the blower voltage calculation map, which is selected after the predetermined time the passenger operated the switch 37 for ten times, will be matched with the passenger's preference. Moreover, after the blower voltage calculation map is selected, learning of the passenger's preference will continue. Namely, the selected blower voltage calculation map is the basis map to learn the passenger's preference and is altered according to the passenger's operation so as to be further close to the passenger's preference with a small amount of times of operation by the passenger.

(Sixth Embodiment)

In this embodiment, the amount of operation by a passenger is reflected to learning of the passenger's preference in a wide range during a predetermined time. After the predetermined time has elapsed, the amount of an operation by the passenger after the predetermined time is reflected to learning the passenger's preference in a narrow range. To achieve the control, the process shown in FIG. 10 is modified to that shown in FIG. 11. The other features are the same as those of the fifth embodiment.

Figure 11:
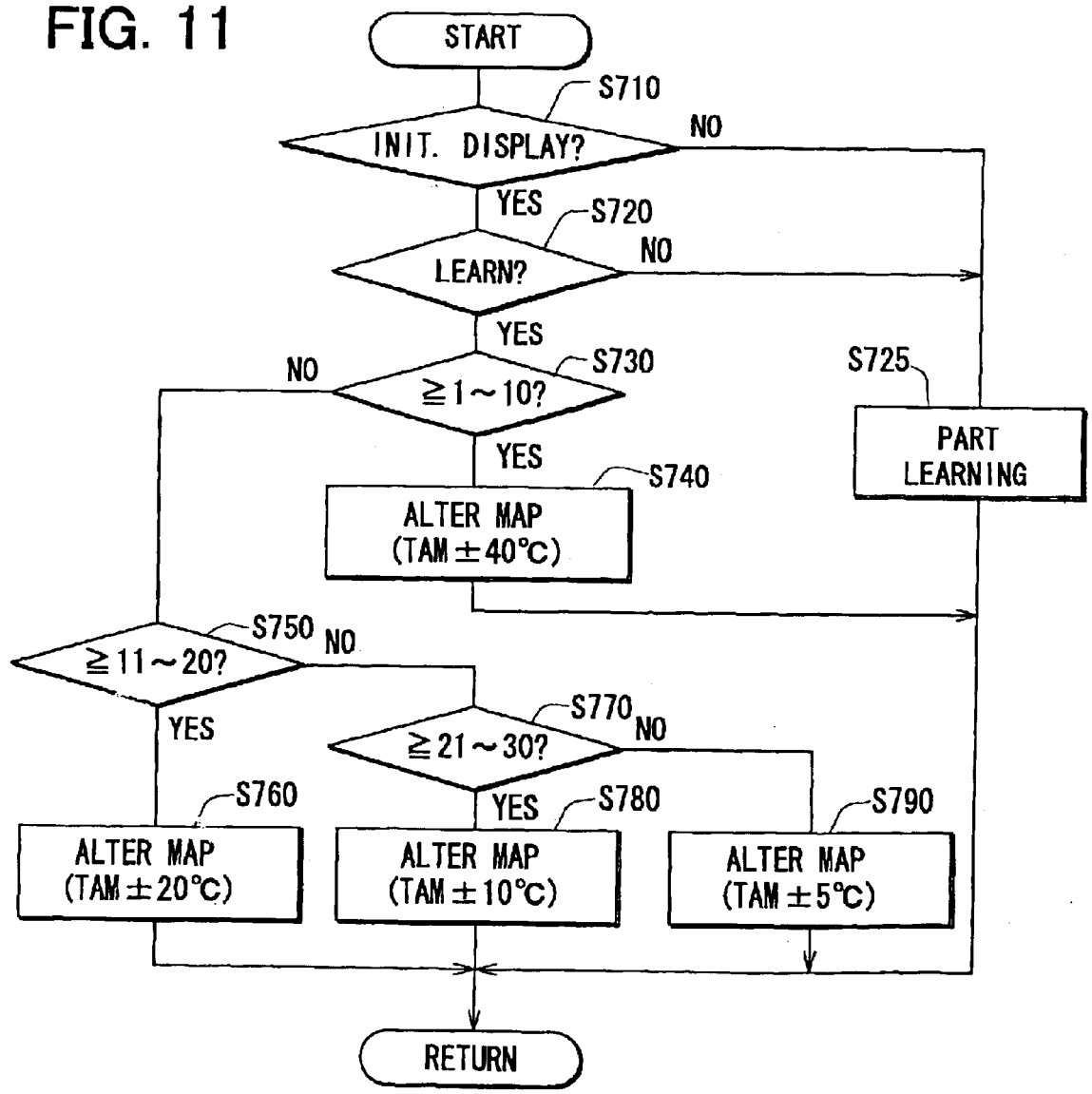
FIG. 11 is a flow chart showing the determination of a specific control characteristic from plural control characteristics regarding a blower voltage calculation map in a sixth embodiment of the present invention.

In FIG. 11, it is determined whether or not an air-conditioning initial setting display is selected on the monitor of the navigation system 50 at step S710. When the air-conditioning initial setting display is on the monitor, the determination at step S710 is "YES", and then, the flow will continue to step S720.

In step S720, it is determined whether or not the passenger has indicated the start for learning the passenger's preference. When the start for the learning is indicated, the determination in step S720 is "YES", and the flow will continue to step S730. The standard blower voltage calculation map memorized previously, which is identical to the pattern a1 in FIG. 10, is used as a basis for learning in the following steps.

In step S730, it is determined the number of times of operation at the blowing air amount adjusting switch 37 by the passenger after the indication of the start for the learning. When the amount of times of the operation is within ten times (one to ten), the determination in step S730 is "YES", and the flow will continue to step S640. In this step, the blower voltage calculation map is altered to learn the passenger's preference in association with the TAO over a range of the outside temperature TAM±40° C. at the time when the blowing air amount adjusting switch 37 is operated.

When the determination in step S730 is "NO", the flow will continue to step S750. When the amount of times of the operation is between eleven and twenty, the determination in step S750 is "YES", and the flow will continue to step S760. In this step, the blower voltage calculation map is altered to learn the passenger's preference in association with the TAO over a range of the outside temperature TAM±20° C. at the time when the blowing air amount adjusting switch 37 is operated.

When the determination in step S750 is "NO", the flow will continue to step S770. When the amount of times of the operation is between twenty-one and thirty, the determination in step S770 is "YES", and the flow will continue to step S780. In this step, the blower voltage calculation map is altered to learn the passenger's preference in association with the TAO over a range of the outside temperature TAM±10° C. at the time when the blowing air amount adjusting switch 37 is operated.

When the determination in step S770 is "NO", that is, when the amount of times of the operation is more than thirty, the flow will continue to step S790. In this step, the blower voltage calculation map is altered to learn the passenger's preference in association with the TAO over a range of the outside temperature TAM±5° C. at the time when the blowing air amount adjusting switch 37 is operated.

On the other hand, when the determinations in steps S710 and S720 are "NO", that is, the air-conditioning initial setting display is not selected, or when the start of learning of the passenger's preference is not indicated, a normal partial learning is performed at step S725.

In this embodiment, the amount of the operation by the passenger is reflected to the learning in the wide range during the predetermined time after the vehicle is purchased. Then, the further amount of the operation by the passenger is reflected to the learning in the narrow range after the predetermined time has passed. Therefore, the blower voltage calculation map can be modified promptly to the one which is matched roughly with the passenger's preference, and then, it can be modified so as further to approach the passenger's preference by the partial learning after the rough learning with a small amount of times of the operation by the passenger.

Similar to the first through third embodiments, the clearing process described in the fourth embodiment shown in FIG. 9 can be also applied to the above-described fifth, sixth, and the following seventh embodiments that is performed with the clear switch (not shown) operated by the passenger.

(Seventh Embodiment)

In this embodiment, the learning is performed using a standard blower voltage calculation map before a basis blower voltage calculation map is determined. Moreover, the determination of the basis blower voltage calculation map is informed to the passenger when it is determined. To accomplish this, the process shown in FIG. 3 is modified to the flow shown in FIG. 12. The other features are the same as those of the fifth embodiment.

Figure 12:
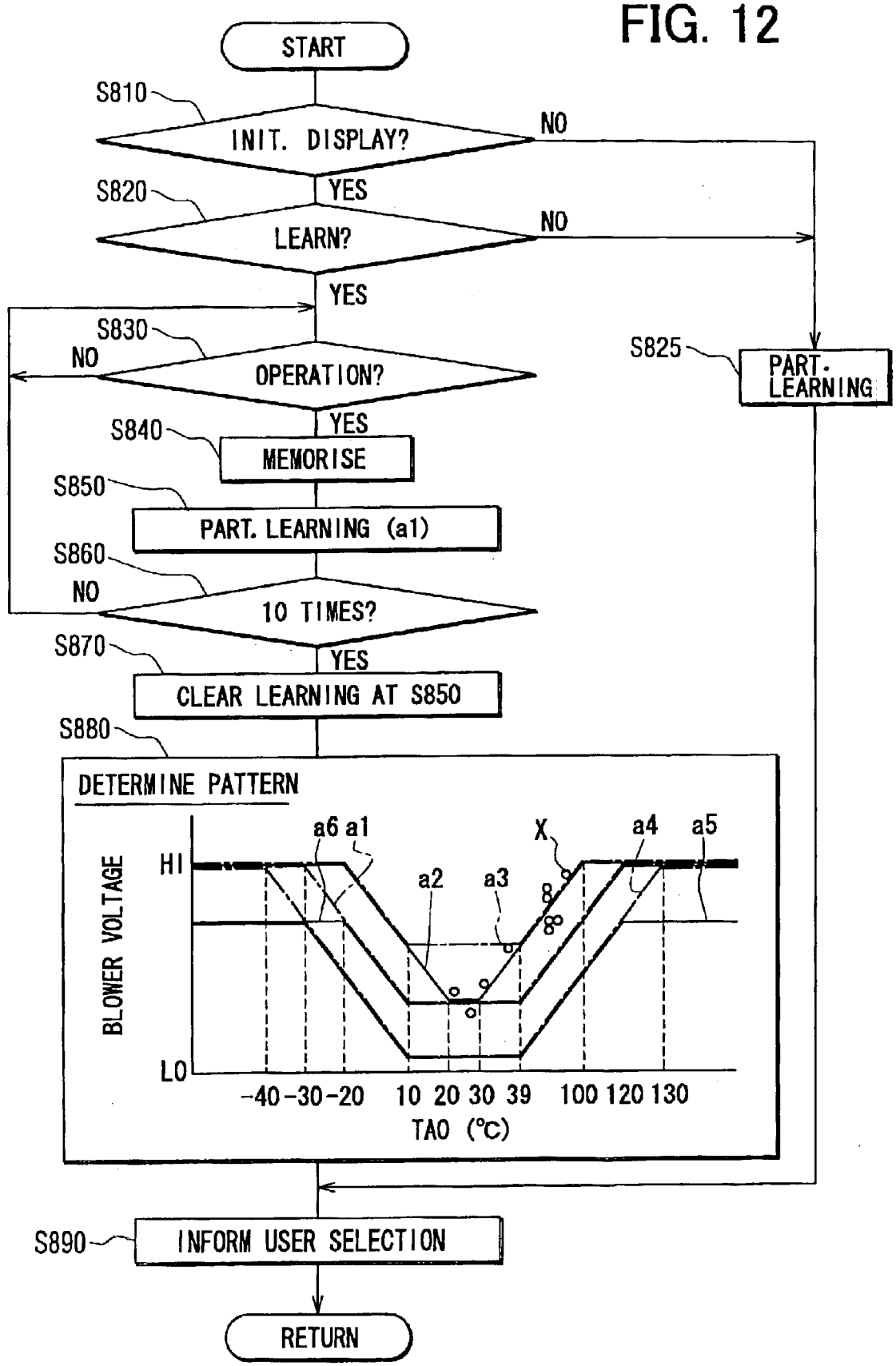
FIG. 12 is a flow chart showing the determination of a specific control characteristic from plural control characteristics regarding a blower voltage calculation map in a seventh embodiment of the present invention.

In FIG. 12, it is determined whether or not an air-conditioning initial setting display is selected on the monitor of the navigation system 50 at step S810. When the air-conditioning initial setting display is on the monitor, the determination at step S810 is "YES", and then, the flow will continue to step S820.

In step S820, it is determined whether or not the passenger has indicated the start for learning the passenger's preference. When the start for the learning is indicated, the determination in step S820 is "YES", and the flow will continue to step S830.

In step S830, it is determined whether or not the passenger has manually changed the amount of the conditioned air blown into the passenger compartment by operating the blowing air amount adjusting switch 37. When the amount of the blown air is changed manually by the passenger, the determination in step S830 is "YES", and the flow will continue to step S840.

In step S840, the air conditioner memorizes the information at the operating point indicated by the blowing air amount adjusting switch 37, i.e., the air-conditioning operating information regarding the amount of the blown air. More specifically, the blower voltage set by the blowing air amount adjusting switch 37 and the TAO at that time are recorded.

Then, the flow will continue to step S850 to conduct the normal partial learning based on the blower voltage calculation map of the pattern a1 shown in FIG. 10 having a standard characteristic of the blowing air amount.

Next, the flow will continue to step S860. The determination in step S860 is "NO" until the number of times of an operation to change the amount of the blown air reaches 10 times. In this case, the steps S830, S840 and S850 are repeated.

As described above, the learning is performed using the blower voltage calculation map in the pattern a1 as the standard blower voltage calculation map during the predetermined period in the beginning of the learning. Therefore, the learning effect is provisionally obtained.

Next, when the number of times of the operation to change the amount of the blown air exceeds ten times, the determination in step S860 is "YES", the flow will continue to step S870. In this step, the blower voltage calculation map, obtained by conducting the normal partial learning at step S850, is cleared.

In the next step S880, the blower voltage calculation map, which is presumed as the one closest to the passenger's preference, is selected among the patterns a1 to a6 of the blower voltage calculation maps shown in FIG. 10 based on the information of ten operating points recorded at step S840. The selection is the same as that in the fifth embodiment. In this embodiment, the blower voltage calculation map in the pattern a2, which has relatively high amount characteristic with respect to the conditioned air blown into the passenger compartment, is selected. Then, the partial learning is conducted using the selected blower voltage calculation map as a basis map.

Next, it is informed to the passenger that the relative high amount characteristic of the blown air is selected as the basis map for subsequently learning of the passenger's preference by using the vehicle navigation system 50. The information of the selected characteristic is displayed on the monitor of the navigation system 50 and announced as the voice information.

By informing the passenger of the selected characteristic, the passenger can recognize that the control of the air-conditioning may be changed after the determination of the basis map. Therefore, informing the passenger of the selected characteristic can prevent the passenger from feeling uncomfortable when the air-conditioning is changed based on the selected blower voltage calculation map.

On the other hand, when the determinations in steps S810 and S820 are "NO", that is, the air-conditioning initial setting display is not selected, or when the start of learning of the passenger's preference is not indicated, a normal partial learning is performed at step S825.

In the above-described fifth through seventh embodiments, the plural patterns of the blower voltage calculation maps are previously provided, and one of them is selected as the basis for learning the passenger's preference based on the operating information by the passenger.

However, the other determination can be applied as follows. First, a standard pattern for the blower voltage calculation map is selected as a basis control characteristic. Then, the blower voltage calculation map, which is supposed to be the most suitable for the passenger, is obtained by calculating the basis control characteristic in light of the operations by the passenger. Or, the blower voltage calculation map, which is supposed to be the most suitable for the passenger, is obtained by simply calculating the operations by the passenger.

Also, each of the fifth through seventh embodiments can be applied to various types air conditioners such as the one having plural air-conditioning zones in a vehicle described above.

In the above-described embodiments, the one is selected from the plural blower voltage calculation maps, or obtained by calculation, based on the personal information of the passenger(s) or the operations by the passenger(s), as the basis control characteristic for learning the passenger's preference. However, the selection or calculation of the control characteristic as the basis characteristic described above can be applied to the other feature such as the inside/outside air suction mode control characteristic, the blow-out mode control characteristic and the blow-out temperature control characteristic.

While the present invention has been shown and described with reference to the foregoing preferred embodiment, it will be apparent to those skilled in the art that changes in form and detail may be therein without departing from the scope of the invention as defined in the appended claims.

What is claimed is:

1. A vehicle air conditioner having automatic control, comprising:
   a control portion having a plurality of control characteristics, for automatically controlling the air-conditioning of a passenger compartment of a vehicle in light of a specific control characteristic; and
   a determining portion for determining said specific control characteristic from said plurality of control characteristics based on at least one of personal information of a passenger and operating information caused by the passenger in a predetermined time interval;
   wherein said control portion learns the passenger's preference by altering said specific control characteristic based on an operation by the passenger after the determination of said specific control characteristic.

2. A vehicle air conditioner having automatic control according to claim 1, wherein said determining portion determines said specific control characteristic as a control characteristic which is supposed to be suitable for the passenger's preference.

3. A vehicle air conditioner having automatic control according to claim 1, wherein said specific control characteristic is selected from said plurality of control characteristics based on at least one of the personal information of the passenger and the operating information caused by the passenger in the predetermined time interval.

4. A vehicle air conditioner having automatic control according to claim 1, wherein said determining portion determines said specific control characteristic by calculating said at least one of the personal information of a passenger and the operating information caused by the passenger in the predetermined time interval.

5. A vehicle air conditioner having automatic control according to claim 1, wherein said control portion automatically controls the air-conditioning with respect to at least one of the amount of the conditioned air blown into the passenger compartment, a blow-out temperature of the conditioned air and a blow-out mode to supply the conditioned air to the passenger compartment.

6. A vehicle air conditioner having automatic control according to claim 1, further comprising an operational portion which is manually operated by the passenger to adjust the air-conditioning.

7. A vehicle air conditioner having automatic control according to claim 1, further comprising an input portion for inputting the personal information of the passenger.

8. A vehicle air conditioner having automatic control according to claim 1, further comprising a receiving portion for receiving the personal information of the passenger sent from a passenger's belongings storing said personal information.

9. A vehicle air conditioner having automatic control according to claim 1, further comprising an image recognition portion for outputting an image signal of the passenger to said control portion, wherein said determining portion determines said specific control characteristic based on the personal information obtained from said image signal of the passenger.

10. A vehicle air conditioner having automatic control according to claim 1, wherein said control portion independently controls a plurality of air-conditioning zones provided in the vehicle, and said determining portion determines a respective specific control characteristic for each air-conditioning zone.

11. A vehicle air conditioner having automatic control according to claim 1, further comprising:
    a blower for blowing the air into the passenger compartment; and
    an operational portion, manually operated by the passenger, for setting the passenger's preference, wherein said control portion includes:
    a setting portion for calculating a target blow-out temperature of the conditioned air based on a preset temperature set by the passenger using said operational portion and detected signals indicative of an environmental condition of the vehicle obtained from sensors provided in the vehicle; and
    a blow-out selecting portion for determining a current blow-out mode from a plurality of blow-out modes based on said target blow-out temperature,
    wherein said setting portion for selecting one from a plurality of control patterns of said current blow-out mode as said specific control characteristic according to said at least one of the personal information of the passenger and the operating information caused by the passenger,
    wherein the control pattern selected from the plurality of control patterns has a relationship between said target blow-out temperature and a control signal for controlling said blower.

12. A vehicle air conditioner having automatic control according to claim 11, wherein said control portion learns the passenger's preference, when said operational portion is operated by the passenger, by altering the control pattern selected from the plurality of control patterns.

13. a vehicle air conditioner having automatic control according to claim 11, wherein said plurality of control patterns are distinctively provided in every blow-out mode for blowing the conditioned air toward a predetermined portion in the passenger compartment, and said control pattern is selected from the plurality of control patterns based on said at least one of the personal information of the passenger and the operating information caused by the passenger in every blow-out mode.

14. A vehicle air conditioner having automatic control according to claim 1, further comprising an operational portion which is manually operated by the passenger to adjust the air-conditioning, wherein said determining portion determines said specific control characteristic based on the operating information that the passenger operates said operational portion during said predetermined time interval, and said control portion alters said specific control characteristic in association with an operation by the passenger after said predetermined time interval has passed.

15. A vehicle air conditioner having automatic control according to claim 14, wherein said predetermined time interval denotes that the number of times of an operation by the passenger reaches a predetermined number after the passenger indicates the start of learning the passenger's preference.

16. A vehicle air conditioner having automatic control according to claim 14, wherein said determining portion determines said specific control characteristic as a control characteristic which is supposed to be the most suitable for the passenger's preference in light of operating points by the passenger during the predetermined time interval.

17. A vehicle air conditioner having automatic control according to claim 14, wherein said control portion has a plurality of control characteristics, and said specific control characteristic is selected from the plurality of control characteristics based on the operating information.

18. A vehicle air conditioner having automatic control according to claim 14, wherein said determining portion calculates said specific control characteristic is selected from the plurality of control characteristics using the operating information.

19. A vehicle air conditioner having automatic control according to claim 14, further comprising a clear portion for canceling said specific control characteristic based on an instruction by the passenger.

20. A vehicle air conditioner having automatic control according to claim 14, wherein said control portion independently controls a plurality of air-conditioning zones provided in the vehicle, and said determining portion determines a respective specific control characteristic for each air-conditioning zone.

21. A vehicle air conditioner having automatic control according to claim 14, wherein said determining portion determines to use a standard control characteristic at first, said control portion learns the passenger's preference from an initial operation at the operational portion by the passenger by altering said standard control characteristic during said predetermined time interval, said control portion uses said specific control characteristic after said predetermined time interval has elapsed and learns the passenger's preference by altering said specific control characteristic based on a subsequent operation at the operational portion by the passenger.

22. A vehicle air conditioner having automatic control according to claim 21, further comprising an informing portion for informing the passenger that said specific control characteristic is determined.

23. A vehicle air conditioner having automatic control according to claim 1, further comprising an operational portion which is manually operated by the passenger to adjust the air-conditioning, wherein said determining portion determines a standard control characteristic as the specific control characteristic based on said predetermined condition, said control portion alters said standard control characteristic according to the operating information that the passenger operates said operational portion,
wherein said control portion alters said standard control characteristic in a predetermined range thereof during a first predetermined time, and said control portion alters said standard control characteristic in a narrow range thereof narrower than said predetermined range during a second predetermined time subsequent to said first predetermined time.

24. A vehicle air conditioner having automatic control according to claim 23, wherein said control portion automatically controls the air-conditioning with respect to at least one of the amount of the conditioned air blown into the passenger compartment, a blow-out temperature of the conditioned air and a blow-out mode to supply the conditioned air to the passenger compartment.

25. A vehicle air conditioner having automatic control according to claim 23, further comprising:

a blower for blowing the air into the passenger compartment; and
an operational portion, manually operated by the passenger, for setting the passenger's preference, wherein said control portion includes:
a setting portion for calculating a target blow-out temperature of the conditioned air based on a preset temperature set by the passenger using said operational portion and detected signals indicative of an environmental condition of the vehicle obtained from sensors provided in the vehicle,
wherein said standard control pattern has a relationship between said target blow-out temperature and a control signal for controlling said blower.

26. A vehicle air conditioner having automatic control, comprising:

a control portion having a plurality of control characteristics, for automatically controlling the air-conditioning of a passenger compartment of a vehicle in light of a specific control characteristic;
a determining portion for determining said specific control characteristic from said plurality of control characteristics based on at least one of personal information of a passenger and operating information caused by the passenger in a predetermined time interval; and
an input portion for inputting the personal information of the passenger;
wherein said input portion is a vehicle navigation system which can display a current position of the vehicle on a monitor, wherein said personal information is input through said monitor.

27. A vehicle air conditioner having automatic control, comprising:

a control portion having a plurality of control characteristics, for automatically controlling the air-conditioning of a passenger compartment of a vehicle in light of a specific control characteristic;
a determining portion for determining said specific control characteristic from said plurality of control characteristics based on at least one of personal information of a passenger and operating information caused by the passenger in a predetermined time interval; and
a clear portion for canceling said specific control characteristic based on an instruction by the passenger.

28. A vehicle air conditioner having automatic control, comprising:

a control portion having a plurality of control characteristics, for automatically controlling the air-conditioning of a passenger compartment of a vehicle in light of a specific control characteristic; and
a determining portion for determining said specific control characteristic from said plurality of control characteristics based on at least one of personal information of a passenger and operating information caused by the passenger in a predetermined time interval;
wherein said personal information of the passenger includes at least one of the age, the length of hair, glasses and contact lenses.

29. A method, applied to a vehicle air conditioner having automatic control, for controlling the air-conditioning in a vehicle, said method comprising the steps of:

determining a specific control characteristic, which is used to control the air-conditioning of the vehicle, by way of at least one of selecting one from a plurality of control characteristics, calculating in association with at least one of the personal information of a passenger and the operating information caused by the passenger, and selecting a standard control characteristic based on a predetermined condition; and controlling the air-conditioning based on said specific control characteristic;

wherein said specific control characteristic is selected based on the operating information that the passenger instructs to alter the air-conditioning in the vehicle during a predetermined time interval at said determining step, said method further including:

altering said specific control characteristic in association with an operational signal by the passenger after said predetermined time interval has passed.

30. A method according to claim 29, further comprising:

inputting the personal information of the passenger, wherein said specific control characteristic is determined using said personal information.

31. A method according to claim 29, further comprising:

receiving the personal information of the passenger from a passenger's belongings which includes said personal information, wherein said specific control characteristic is determined using said personal information.

32. A method according to claim 29, further comprising:

obtaining an image signal of the passenger; and analyzing said image signal of the passenger for recognizing said personal information, wherein said specific control characteristic is determined using said personal information.

33. A method according to claim 29, wherein said standard control characteristic is determined as the specific control characteristic based on said predetermined condition at said determining step, said method further comprising:

altering said standard control characteristic according to an operational signal by the passenger, wherein said altering step includes:

first altering said standard control characteristic in a predetermined range thereof during a first predetermined time interval; and second altering said standard control characteristic in a narrow range thereof narrower than said predetermined range during a second predetermined time interval subsequent to said first predetermined time interval.

* * * * *